US010725482B2

(12) United States Patent
Zhu et al.

(10) Patent No.: US 10,725,482 B2
(45) Date of Patent: Jul. 28, 2020

(54) METHOD AND APPARATUS FOR DODGING OBSTACLE, AND AERIAL VEHICLE

(71) Applicant: AUTEL ROBOTICS CO., LTD., Shenzhen, Guangdong (CN)

(72) Inventors: Ying Zhu, Guangdong (CN); Yu Song, Guangdong (CN); Denglu Wu, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 200 days.

(21) Appl. No.: 15/884,980

(22) Filed: Jan. 31, 2018

(65) Prior Publication Data
US 2019/0196510 A1 Jun. 27, 2019

Related U.S. Application Data

(63) Continuation of application No. PCT/CN2017/118673, filed on Dec. 26, 2017.

(51) Int. Cl.
*G05D 1/10* (2006.01)
*B64C 39/02* (2006.01)

(52) U.S. Cl.
CPC ........... *G05D 1/101* (2013.01); *B64C 39/024* (2013.01); *G05D 1/102* (2013.01); *B64C 2201/024* (2013.01); *B64C 2201/141* (2013.01)

(58) Field of Classification Search
CPC ........ G05D 1/101; G05D 1/102; G05D 1/021; B64C 39/024; B64C 2201/024; B64C 2201/141
See application file for complete search history.

(56) References Cited

U.S. PATENT DOCUMENTS

| 9,412,278 B1* | 8/2016 | Gong | G06F 16/29 |
| 2005/0090955 A1* | 4/2005 | Engelman | B60W 10/20 |
| | | | 701/36 |

(Continued)

FOREIGN PATENT DOCUMENTS

| CN | 102968911 A | 3/2013 |
| CN | 103543751 A | 1/2014 |

(Continued)

OTHER PUBLICATIONS

Adrien Briod, et al; "Contact-based navigation for an autonomous flying robot", Published in: 2013 IEEE/RSJ International Conference on Intelligent Robots and Systems, Nov. 3-7, 2013; 6 pages.

(Continued)

*Primary Examiner* — Rodney A Butler

(57) ABSTRACT

The present invention discloses a method and an apparatus for dodging an obstacle, and a movable object. The method includes: obtaining acceleration information of a movable object; determining, according to the acceleration information of the movable object that the movable object collides; determining, according to the acceleration information, a direction for dodging an obstacle; and controlling the movable object to move along the direction for dodging the obstacle, to avoid the obstacle. In embodiments of the present invention, collision of the movable object and a dodging direction can be accurately informed according to the acceleration information of the movable object, to effectively avoid an obstacle and avoid continuously hitting the obstacle.

15 Claims, 5 Drawing Sheets

(56) References Cited

U.S. PATENT DOCUMENTS

2011/0264309 A1* 10/2011 Molander ............... G01S 11/12
                                                              701/11
2017/0177004 A1    6/2017 Wang et al.
2019/0051007 A1*  2/2019 Pohl ...................... B64C 39/024

FOREIGN PATENT DOCUMENTS

| CN | 103576692 A | 2/2014 |
|---|---|---|
| CN | 104076817 A | 10/2014 |
| CN | 105573339 A | 5/2016 |
| CN | 107368071 A | 11/2017 |

OTHER PUBLICATIONS

Seung Y. Na; et al; "Collision Recognition and Direction Changes Using Fuzzy Logic for Small Scale Fish Robots by Acceleration Sensor Data", Design for Manufacturability Through Design-Process Integration III, vol. 5804, May 27, 2005; p. 772, XP055576705.
Hamdy A. Ibrahim, et al; "A system for vehicle collision and rollover detection", Published in: 2016 IEEE Canadian Conference on Electrical and Computer Engineering (CCECE), May 15-18, 2016; **Abstract Only**.
Supplementary European Search Report completed Apr. 3, 2019; EP 17 83 2183.
International Search Report dated Sep. 5, 2018; PCT/CN2017/118673.

* cited by examiner

METHOD AND APPARATUS FOR DODGING OBSTACLE, AND AERIAL VEHICLE

CROSS REFERENCE

This application is a continuation of International Application No. PCT/CN2017/118673, filed on Dec. 26, 2017, the disclosure of which is hereby incorporated by reference in its entirety.

TECHNICAL FIELD

The present invention relates to the field of controlling, and in particular, to a method and an apparatus for dodging an obstacle, and an aerial vehicle.

RELATED ART

In a movement process of a movable object, the movable object may be damaged because the movable object cannot dodge an obstacle after hitting the obstacle. The movable object may be an unmanned aerial vehicle, a robot, an unmanned ship, a manned aerial vehicle, an automobile, or the like. In a flight process of an unmanned aerial vehicle, the unmanned aerial vehicle may be damaged because the unmanned aerial vehicle cannot dodge an obstacle in time after hitting the obstacle. In a serious case, the unmanned aerial vehicle may crash.

An existing technology for avoiding an obstacle is based on an infrared sensor or a radar sensor. The existing technology identifies and avoids the obstacle by a processor performing complex algorithm. However, this manner has a relatively high requirement on a processor and an environment condition, and may not achieve a desirable effect for avoiding an obstacle.

SUMMARY

To resolve the foregoing technical problem, the present invention provides a method and an apparatus for dodging an obstacle, and an aerial vehicle, so that a movable object can take effective dodging measures after hitting the obstacle.

To achieve the objective of the present invention, the present invention provides a method for dodging an obstacle, applied to a movable object. The method includes:
 obtaining acceleration information of the movable object;
 determining, according to the acceleration information of the movable object, that the movable object collides;
 determining, according to the acceleration information, a direction for dodging an obstacle; and
 controlling the movable object to move along the direction for dodging the obstacle, to avoid the obstacle.

In an embodiment of the present invention, the acceleration information includes an acceleration change rate of at least one direction.

In an embodiment of the present invention, the determining, according to the acceleration information of the movable object, that the movable object collides includes:
 determining whether the acceleration change rate of the at least one direction is greater than an acceleration change rate threshold; and
 if yes, determining that the movable object collides.

In an embodiment of the present invention, the determining, according to the acceleration information, a direction for dodging an obstacle includes:
 determining an acceleration change rate of the movable object according to a vector sum of the acceleration change rate of the at least one direction; and
 determining a direction of the acceleration change rate as the direction for dodging the obstacle.

In an embodiment of the present invention, the determining a direction of the acceleration change rate as the direction for dodging the obstacle includes:
 calculating angles α, β and γ between the acceleration change rate of the movable object and x axis, y axis and z axis in three-dimensional space:

$$\alpha = \tan^{-1}\frac{\sqrt{\Delta A_y^2 + \Delta A_z^2}}{\Delta A_x}; \beta = \tan^{-1}\frac{\sqrt{\Delta A_y^2 + \Delta A_x^2}}{\Delta A_z}; \text{ and}$$

$$\gamma = \tan^{-1}\frac{\sqrt{\Delta A_x^2 + \Delta A_z^2}}{\Delta A_y},$$

where
 $\Delta A_x$, $\Delta A_y$ and $\Delta A_z$ are respectively acceleration change rates in three directions of x axis, y axis and z axis perpendicular to each other; and
 determining the direction for dodging the obstacle according to the α, β and γ.

In an embodiment of the present invention, x axis is a moving direction of the movable object.

In an embodiment of the present invention, the movable object is an aerial vehicle, and a positive direction of x axis is the flight direction of the aerial vehicle.

In an embodiment of the present invention, the acceleration information includes acceleration change rates of two or three directions.

In an embodiment of the present invention, the obtaining acceleration information of the movable object includes:
 obtaining the acceleration information measured by an inertial measurement unit (IMU) built in the movable object.

In an embodiment of the present invention, the method further includes:
 recording a collision position of the movable object.

In an embodiment of the present invention, the location includes geographical coordinates and a flight height.

In an embodiment of the present invention, the method further includes:
 when the movable object moves towards the collision position of the movable object, and a distance between the movable object and the collision position of the movable object is less than a preset distance, moving, by the movable object, along the direction for dodging the obstacle.

An embodiment of the present invention further provides an apparatus for dodging an obstacle, applied to a movable object. The apparatus includes:
 an obtaining module, configured to obtain acceleration information of the movable object;
 a determining module, configured to determine, according to the acceleration information of the movable object, that the movable object collides; and
 determine, according to the acceleration information, a direction for dodging an obstacle; and
 a control module, configured to control the movable object to move along the direction for dodging the obstacle, to avoid the obstacle.

In an embodiment of the present invention, the acceleration information includes an acceleration change rate of at least one direction.

In an embodiment of the present invention, the determining module is specifically configured to:

determine whether the acceleration change rate of the at least one direction is greater than an acceleration change rate threshold; and if yes, determine that the movable object collides.

In an embodiment of the present invention, the determining module is specifically configured to:

determine an acceleration change rate of the movable object according to a vector sum of the acceleration change rate of the at least one direction; and determine a direction of the acceleration change rate as the direction for dodging the obstacle.

In an embodiment of the present invention, the determining module includes a calculation module, and the calculation module is configured to:

calculate angles α, β and γ between the acceleration change rate of the movable object and x axis, y axis and z axis in three-dimensional space:

$$\alpha = \tan^{-1}\frac{\sqrt{\Delta A_y^2 + \Delta A_z^2}}{\Delta A_x}; \beta = \tan^{-1}\frac{\sqrt{\Delta A_y^2 + \Delta A_x^2}}{\Delta A_z}; \text{ and}$$

$$\gamma = \tan^{-1}\frac{\sqrt{\Delta A_x^2 + \Delta A_z^2}}{\Delta A_y},$$

where $\Delta A_x$, $\Delta A_y$ and $\Delta A_z$ are respectively acceleration change rates in three directions of x axis, y axis and z axis perpendicular to each other; and the determining module determines, according to the α, β and γ, the direction for dodging the obstacle.

In an embodiment of the present invention, x axis is a moving direction of the movable object.

In an embodiment of the present invention, the movable object is an aerial vehicle, and a positive direction of x axis is the flight direction of the aerial vehicle.

In an embodiment of the present invention, the acceleration information includes acceleration change rates of two or three directions.

In an embodiment of the present invention, the obtaining module is specifically configured to:

obtain the acceleration information measured by an IMU built in the movable object.

In an embodiment of the present invention, the apparatus further includes a recording module, and the recording module is configured to record a collision location of the movable object.

In an embodiment of the present invention, the location includes geographical coordinates and a flight height.

In an embodiment of the present invention, the control module is further configured to:

when the movable object moves towards the collision position of the movable object, and a distance between the movable object and the collision position of the movable object is less than a preset distance, control the movable object to move along the direction for dodging the obstacle.

An embodiment of the present invention further provides an aerial vehicle, including:

a vehicle body;
an arm, connected to the vehicle body;
an actuating apparatus, disposed on the arm;
a processor; and
an IMU, in communication connection with the processor, and configured to obtain acceleration information of the aerial vehicle, where the processor is configured to:

determine, according to the acceleration information of the aerial vehicle, that the aerial vehicle collides;

determine, according to the acceleration information, a direction for dodging an obstacle; and control the aerial vehicle to move along the direction for dodging the obstacle, to avoid the obstacle.

In an embodiment of the present invention, the acceleration information includes an acceleration change rate of at least one direction.

In an embodiment of the present invention, the processor is configured to:

determine whether the acceleration change rate of the at least one direction is greater than an acceleration change rate threshold; and if yes, determine that the aerial vehicle collides.

In an embodiment of the present invention, the processor is configured to:

determine an acceleration change rate of the aerial vehicle according to a vector sum of the acceleration change rate of the at least one direction; and determine a direction of the acceleration change rate as the direction for dodging the obstacle.

In an embodiment of the present invention, the processor is configured to:

calculate angles α, β and γ between the acceleration change rate of the aerial vehicle and x axis, y axis and z axis in three-dimensional space:

$$\alpha = \tan^{-1}\frac{\sqrt{\Delta A_y^2 + \Delta A_z^2}}{\Delta A_x}; \beta = \tan^{-1}\frac{\sqrt{\Delta A_y^2 + \Delta A_x^2}}{\Delta A_z}; \text{ and}$$

$$\gamma = \tan^{-1}\frac{\sqrt{\Delta A_x^2 + \Delta A_z^2}}{\Delta A_y},$$

where $\Delta A_x$, $\Delta A_y$ and $\Delta A_z$ are respectively acceleration change rates in three directions of x axis, y axis and z axis perpendicular to each other; and determine, according to the α, β and γ, the direction for dodging the obstacle.

In an embodiment of the present invention, x axis is a moving direction of the aerial vehicle.

In an embodiment of the present invention, a positive direction of x axis is a flight direction of the aerial vehicle.

In an embodiment of the present invention, the acceleration information includes acceleration change rates of two or three directions.

In an embodiment of the present invention, the processor is further configured to:

record a collision location.

In an embodiment of the present invention, the location includes geographical coordinates and a flight height.

In an embodiment of the present invention, the processor is further configured to:

when the aerial vehicle moves towards the collision position of the aerial vehicle, and a distance between the aerial vehicle and the collision position of the aerial vehicle is less than a preset distance, control the aerial vehicle to move along the direction for dodging the obstacle.

An embodiment of the present invention further provides a movable object, including a processor and a computer readable storage medium, where the computer readable storage medium stores an instruction, and when the instruction is executed by the processor, the foregoing method for dodging an obstacle is implemented.

An embodiment of the present invention further provides a computer readable storage medium, storing a computer program, where when the computer program is executed by a processor, the foregoing method for dodging an obstacle is implemented.

The embodiments of the present invention include: obtaining the acceleration information of the movable object; determining, according to the acceleration information of the movable object, that the movable object collides; determining, according to the acceleration information, a direction for dodging an obstacle; and controlling the movable object to move along the direction for dodging the obstacle, to avoid the obstacle. In the embodiments of the present invention, collision of the movable object and a dodging direction can be accurately informed according to the acceleration information of the movable object, to effectively dodge the obstacle and avoid continuously hitting the obstacle.

In an optional solution, an IMU built in the movable object may be used as an apparatus for detecting the acceleration information, and no additional hardware needs to be added, to reduce hardware costs.

In an optional solution, the collision location of the movable object is recorded. When the movable object moves towards the location and is relatively close to the location, the movable object moves along the direction for dodging the obstacle, to avoid collision, and further ensure safety of the movable object.

Other characteristics and advantages of the present invention are described below in the specification, and some characteristics and advantages of the present invention become obvious in the specification, or are known in implementation of the present invention. Objectives and other advantages of the present invention may be implemented and obtained according to structures particularly described in the specification, claims, and accompanying drawings.

BRIEF DESCRIPTION OF THE DRAWINGS

Accompanying drawings are used to further understand the technical solutions of the present invention, constitute a part of the specification, are used to describe the technical solutions of the present invention together with embodiments of the present application, and constitute no limitation on the technical solutions of the present invention.

DETAILED DESCRIPTION

To make the objectives, technical solutions, and advantages of the present invention more comprehensible, embodiments of the present invention are described below in detail with reference to the accompanying drawings. It should be noted that the embodiments of the present application and characteristics of the embodiments may be randomly combined with each other provided that there is no conflict.

Steps shown in flowcharts of the accompanying drawings may be performed, for example, in a computer system of a set of computer executable instructions. In addition, although a logical sequence is shown in a flowchart, the shown or described steps may be performed in a different sequence in some cases.

Embodiments of the present invention provide a method and an apparatus for dodging an obstacle. The method and the apparatus may be applied to a movable object, so that the movable object can identify a collision direction during collision, and the movable object is controlled to move in a direction opposite to the collision direction to avoid the obstacle in time.

The movable object in the embodiments of the present invention may be an unmanned aerial vehicle, a manned aerial vehicle, an unmanned automobile, an unmanned ship, an intelligent robot (such as a floor sweeping robot or a floor mopping robot), and the like.

Figure 1:
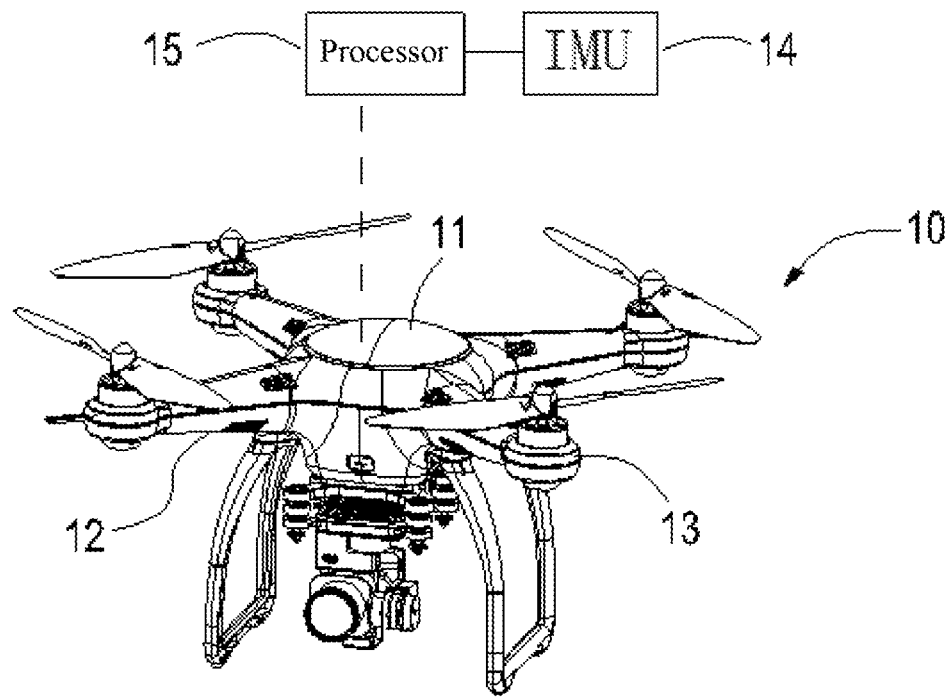
FIG. 1 is a schematic structural diagram of an aerial vehicle according to an embodiment of the present invention.

Referring to FIG. 1, an example in which the movable object is an aerial vehicle 10 is used to specifically describe the embodiments of the present invention. The aerial vehicle 10 includes a vehicle body 11, an arm 12, an actuating apparatus 13, an Inertial Measurement Unit (IMU) 14, and a processor 15.

The arm 12 is connected to the vehicle body 11, the actuating apparatus 13 is disposed on the arm 12, and the IMU 14 is in communication connection with the processor 15, and the IMU 14 is configured to obtain acceleration information of the aerial vehicle 10. In the embodiments of the present invention, the IMU 14 may be disposed within the vehicle body 11.

In this embodiment, the aerial vehicle 10 includes four arms 12, that is, the aerial vehicle in this embodiment is a quadrotor aerial vehicle. In another possible embodiment, the aerial vehicle 10 may be a rotary aerial vehicle, a fixed wing aerial vehicle, or an aerial vehicle that combines a fixed wing and a rotary wing. The rotary aerial vehicle may have single rotor (one arm), two rotors (two arms), three rotors (three arms), six rotors (six arms), eight rotors (eight arms), or the like.

The actuating apparatus 13 usually includes a motor disposed at the end of the arm 12 and a propeller connected to a shaft of the motor. The motor drives the propeller to rotate to provide a lift force for the movable object 10.

The IMU 14 may measure a three-axis attitude angle (or an angular velocity) and an acceleration of the aerial vehicle 10, and is usually disposed at a position of a center of gravity of the aerial vehicle 10. Generally, one IMU 14 includes three single-axis accelerators and three single-axis gyroscopes. The three accelerators separately detect acceleration signals of the aerial vehicle 10 in three axes of three-dimensional space. The gyroscope detects an angular speed signal. The IMU 14 measures an angular speed and an acceleration of the aerial vehicle 10 in three-dimensional space, and calculates an attitude of the aerial vehicle 10 according to the angular speed and the acceleration of the aerial vehicle 10.

In this embodiment of the present invention, the IMU 14 may be an IMU coming with the aerial vehicle 10. In another possible embodiment, the IMU 14 may be an additionally added IMU chip, and the IMU chip may be fixed on the movable object 10 by means of a hard connection.

The processor 15 may include multiple functional units, for example, a flight control unit configured to control a flight attitude of the aerial vehicle, a target identification unit configured to identify a target, a tracking unit configured to track a particular target, a navigation unit (for example, a GPS (Global Positioning System) or Beidou) configured to navigate the aerial vehicle, and a data processing unit configured to process environment information obtained by a related airborne device.

The processor 15 determines, by obtaining the acceleration information detected by the IMU 14, whether the aerial vehicle 10 collides. In an embodiment of the present invention, the acceleration information includes an acceleration change rate of at least one direction.

Figure 2:
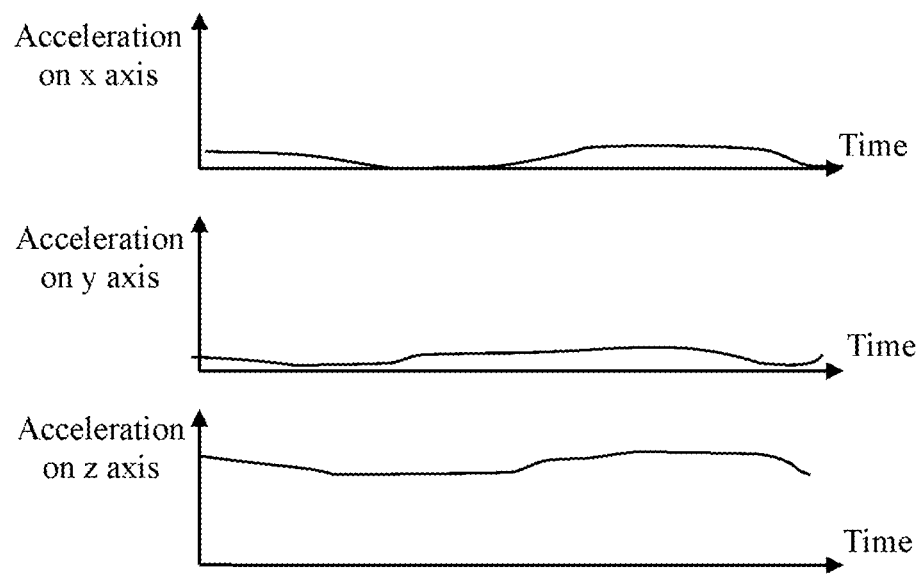
FIG. 2 is a schematic diagram of accelerations in three directions when the aerial vehicle shown in FIG. 1 flies normally according to the present invention.
Figure 3:
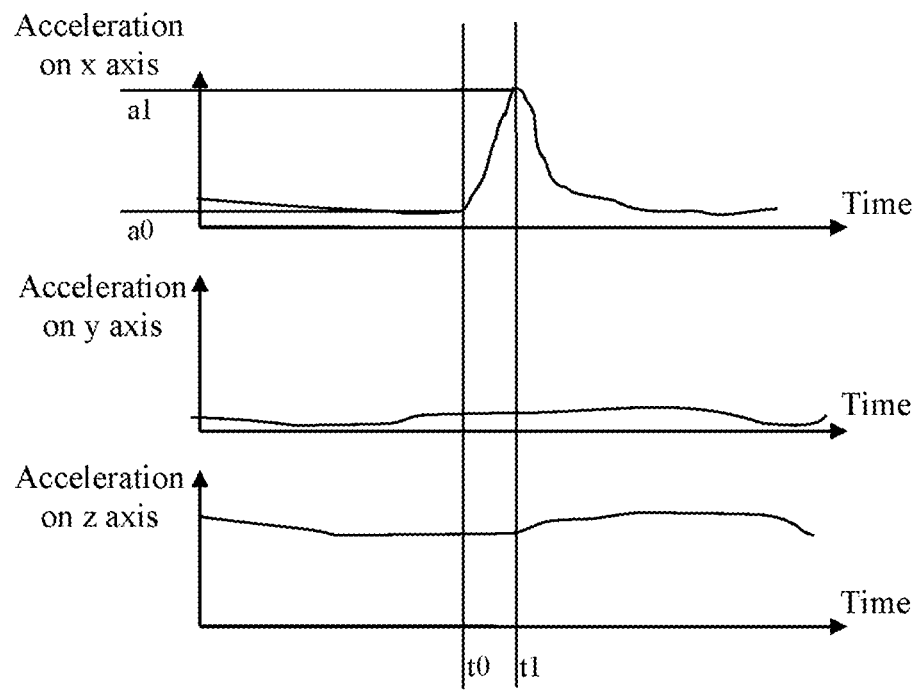
FIG. 3 is a schematic diagram showing that an acceleration of the aerial vehicle shown in FIG. 1 in a direction of x axis suddenly changes according to the present invention.

In a case of normal flight, an acceleration of the aerial vehicle 10 is in a process of slowly changing, as shown in FIG. 2. After the aerial vehicle 10 collides, as shown in FIG. 3, the acceleration measured by the IMU 14 suddenly changes. A change degree of the acceleration may be represented by the acceleration change rate, but when the acceleration change rate is greater than an acceleration change threshold, the processor 15 determines that the aerial vehicle 10 collides. An example in which an acceleration in a direction of x axis suddenly changes is used. Assuming that an acceleration value at a time point t0 is a0, and an acceleration value at a next detection time point t1 is a1, the acceleration change rate at the time point t1 is:

$$\Delta A = \frac{a1 - a0}{a0}.$$

Assuming that the acceleration change rate threshold is Ah, if it is found at the time point t1 that |ΔA|>Ah in x axis, the processor 15 determines, according to the acceleration change rate in x axis, that the aerial vehicle 10 collides in a direction of x axis, and determines the direction for dodging the obstacle on this basis. The acceleration change rate threshold Ah may be set according to experience, and this is not specifically limited in the present invention.

When the processor 15 detects that the acceleration change rates of the IMU 14 in three directions of space all exceed a preset threshold, an acceleration change rate of the aerial vehicle may be determined by resolving a vector sum of the acceleration change rates in three directions, and a direction of the acceleration change rate is the direction for dodging the obstacle by the aerial vehicle 10.

Figure 4:
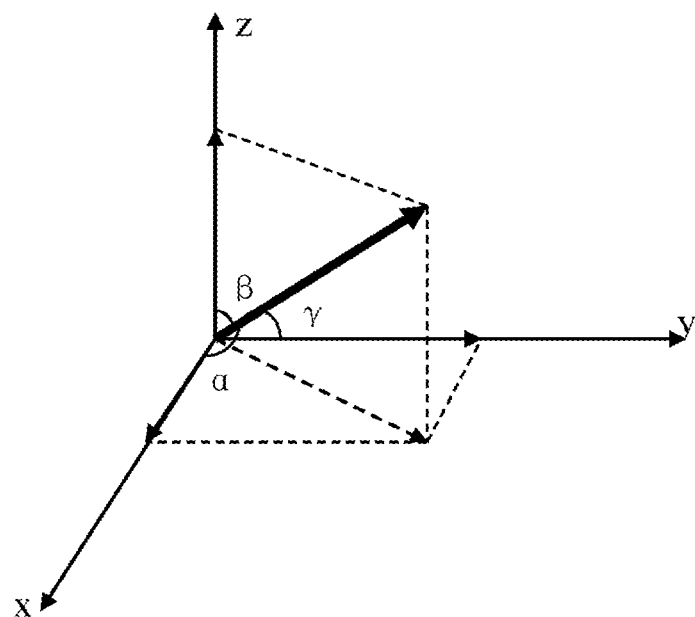
FIG. 4 is a schematic diagram showing that the aerial vehicle shown in FIG. 1 calculates angles between a dodging direction and x, y and z axes according to the present invention.

As shown in FIG. 4, assuming that a flight direction, that is, a flight direction of the aerial vehicle 10 is a positive direction of x axis, and a direction pointing to the sky is a direction of z axis, angles between the acceleration change rate and x axis, y axis and z axis of the three-dimensional space are respectively α, β and γ as follows:

$$\alpha = \tan^{-1}\frac{\sqrt{\Delta A_y^2 + \Delta A_z^2}}{\Delta A_x}; \beta = \tan^{-1}\frac{\sqrt{\Delta A_y^2 + \Delta A_x^2}}{\Delta A_z}; \text{ and}$$

-continued $$\gamma = \tan^{-1}\frac{\sqrt{\Delta A_x^2 + \Delta A_z^2}}{\Delta A_y},$$

where $\Delta A_x$, $\Delta A_y$, and $\Delta A_z$ are respectively acceleration change rates in three directions of x axis, y axis and z axis.

The direction for dodging the obstacle by the aerial vehicle in space may be determined according to the three angles.

In another possible embodiment, if only considering dodging on a plane, just projecting the acceleration change rate to the plane.

In an embodiment of the present invention, the processor 15 may further record a collision location of the aerial vehicle 10. The location includes geographical coordinates and a flight height. When the aerial vehicle 10 flies to the collision location, and a distance between the aerial vehicle 10 and the location is less than a preset threshold, the processor 15 controls the aerial vehicle 10 to move along the direction for dodging the obstacle determined according to the foregoing method.

In an embodiment of the present invention, the processor 15 is further configured to:

send collision location information to a control device, so that makes the control device display the location information, inform an operator the geographical location, and prevent the operator from controlling the aerial vehicle to fly to the location to hit the obstacle again.

In an embodiment of the present invention, the processor 15 is further configured to:

when the aerial vehicle 10 moves towards the collision location, and a distance between the aerial vehicle and the collision location is less than the preset distance, control the actuating apparatus according to a preset rule or a control instruction, to avoid collision.

The preset rule may be switching to fly in a direction such as below, above, or on the left or right of the collision location and away from the collision location by a specified distance, or staying at a current location and waiting for a subsequent control instruction and the like.

In an embodiment of the present invention, the processor 15 is further configured to: when the aerial vehicle 10 moves towards the collision location, and a distance between the aerial vehicle and the collision location is less than the preset distance, send alert information to a control device.

In an embodiment of the present invention, the processor 15 is configured to: when the aerial vehicle 10 moves towards the collision location, and a distance between the aerial vehicle and the collision location is less than the preset distance, send alert information to a control device, and receive a control instruction returned by the control device, to avoid collision again.

In this embodiment of the present invention, collision of the aerial vehicle and an dodging direction can be accurately informed according to the acceleration information of the aerial vehicle, to effectively avoid an obstacle and avoid continuously hitting the obstacle. An IMU built in the aerial vehicle may be used as an apparatus for detecting the acceleration information, and no additional hardware needs to be added, to reduce hardware costs. In an optional solution, the collision location of the aerial vehicle is recorded. When the aerial vehicle moves towards the location and is relatively close to the location, the aerial vehicle moves along the direction for dodging the obstacle, to avoid collision, and further ensure safety of the movable object.

Figure 5:
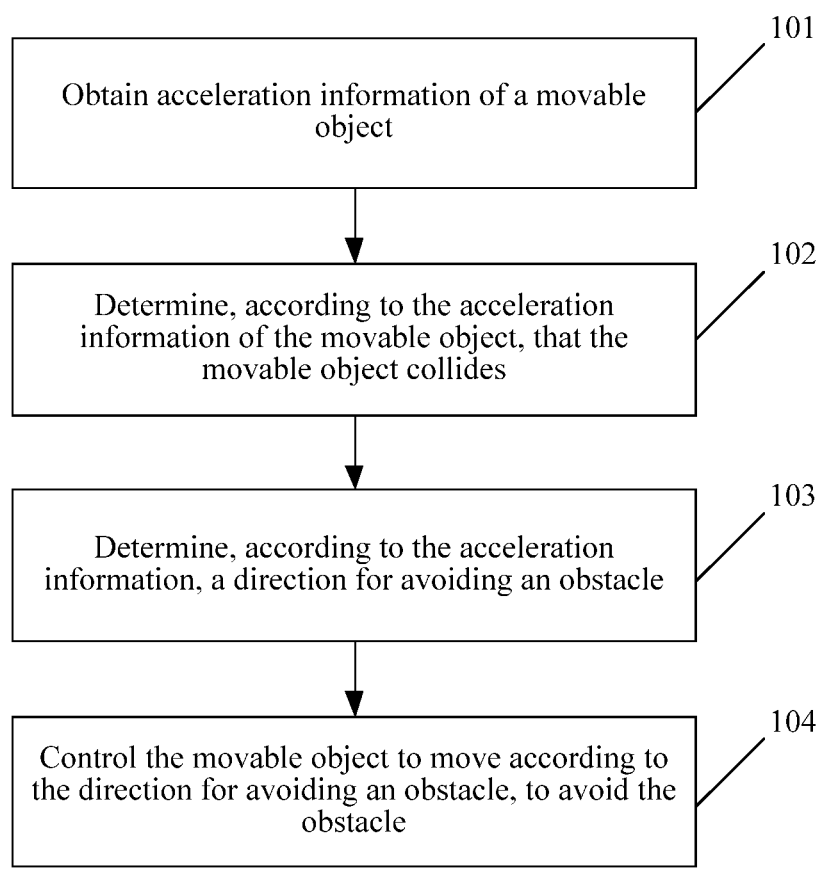
FIG. 5 is a flowchart of a method for dodging an obstacle according to an embodiment of the present invention.

FIG. 5 is a flowchart of a method for dodging an obstacle according to an embodiment of the present invention. The method may be applied to a movable object, and the method includes the following steps.

Step 101: Obtain acceleration information of the movable object.

The movable object is an object that can move and a moving direction thereof can be controlled. For example, an aerial vehicle that can fly or a vehicle that moves on the land.

When the movable object is an aerial vehicle, the aerial vehicle may be a rotary aerial vehicle, a fixed wing aerial vehicle, or an aerial vehicle that combines a fixed wing and a rotary wing. The rotary aerial vehicle may have single rotor, two rotors, three rotors, four rotors, six rotors, eight rotors, or the like. The aerial vehicle may include but is not limited to an unmanned aerial vehicle. In another possible embodiment, the movable object may further be an unmanned automobile, a floor sweeping robot, a floor mopping robot, and the like.

In an embodiment of the present invention, the acceleration information is obtained by a built in IMU. In this solution, no additional hardware needs to be added and hardware costs are reduced.

The IMU may measure a three-axis attitude angle (or an angular velocity) and an acceleration of the movable object, and is usually disposed at a position of a center of gravity of the movable object. Generally, one IMU includes three single-axis accelerators and three single-axis gyroscopes. The accelerator detects a three-axis acceleration signal of the movable object. The gyroscope detects an angular speed signal. The IMU measures an angular speed and an acceleration of the movable object in three-dimensional space, and calculates an attitude of the movable object according to the angular speed and the acceleration of the movable object.

The IMU may be an IMU coming with the movable object, or may be an additionally added IMU chip, and the IMU chip may be fixed on the movable object by means of a hard connection.

In an embodiment of the present invention, the acceleration information includes an acceleration change rate of at least one direction.

An example of three directions of x axis, y axis and z axis in three-dimensional space is used. X axis, y axis and z axis are perpendicular to each other, and the acceleration information may include an acceleration change rate of at least one of the three directions of x axis, y axis and z axis.

In an embodiment of the present invention, the acceleration information includes acceleration change rates of two or three directions.

For example, the acceleration information may include acceleration change rates of the three directions of x axis, y axis and z axis, or may include acceleration change rates of any two of the three directions of x axis, y axis and z axis.

Step 102: Determine, according to the acceleration information of the movable object, that the movable object collides.

An example of three directions of x axis, y axis and z axis in three-dimensional space is used. In a case of normal flight, an acceleration of the movable object is in a process of slowly changing, as shown in FIG. 2.

In an embodiment of the present invention, it is determined whether the acceleration change rate of the at least one direction is greater than an acceleration change rate threshold; if yes, it is determined that the movable object collides.

When an acceleration in at least one direction suddenly changes, as shown in FIG. 3, an example in which an acceleration in a direction of x axis suddenly changes is used. Assuming that an acceleration value at a time point t0 is a0, and an acceleration value at a next detection time point t1 is a1, the acceleration change rate at the time point t1 is:

$$\Delta A = \frac{a1 - a0}{a0}.$$

The acceleration change rate threshold is Ah. If it is found at the time point t1 that $|\Delta A| > Ah$ in any axis, it is considered that a collision occurs. Change rates in three axes at this time are separately recorded as $\Delta A_x$, $\Delta A_y$ and $\Delta A_z$.

The acceleration change rate threshold Ah may be set in advance according to experience, and this is not specifically limited in the present invention.

Step 103: Determine, according to the acceleration information, a direction for dodging an obstacle.

In an embodiment of the present invention, an acceleration change rate of the movable object is determined according to a vector sum of the acceleration change rate of the at least one direction; and a direction of the acceleration change rate is determined as the direction for dodging the obstacle.

If only considering dodging on a plane, just projecting a direction of the vector sum to the plane.

As shown in FIG. 4, x axis is a moving direction of the movable object, y axis is obtained by rotating anticlockwise x axis by 90 degrees on a horizontal plane, and the sky is z axis. That is, x axis, y axis and z axis are perpendicular to each other. Angles α, β and γ between the acceleration change rate of the movable object and x axis, y axis and z axis of the three-dimensional space are calculated as follows:

$$\alpha = \tan^{-1} \frac{\sqrt{\Delta A_y^2 + \Delta A_z^2}}{\Delta A_x}; \beta = \tan^{-1} \frac{\sqrt{\Delta A_y^2 + \Delta A_x^2}}{\Delta A_z}; \text{ and}$$

$$\gamma = \tan^{-1} \frac{\sqrt{\Delta A_x^2 + \Delta A_z^2}}{\Delta A_y},$$

where $\Delta A_x$, $\Delta A_y$ and $\Delta A_z$ are respectively acceleration change rates in three directions of x axis, y axis and z axis.

The direction for dodging the obstacle is determined according to the α, β and γ.

In an embodiment of the present invention, the movable object is an aerial vehicle, and a positive direction of x axis is a flight direction of the aerial vehicle.

In another embodiment, a collision direction may further be determined according to the acceleration information, and a direction opposite to the collision direction is a dodging direction.

Similar to the foregoing descriptions, a collision direction determined according to the acceleration information may be determined by using the acceleration change rate of the at least one direction, and is an opposite direction of the vector sum of the acceleration change rate. A calculation method is similar to that in the foregoing descriptions, and detailed descriptions are not provided herein again.

Step 104: Control the movable object to move along the direction for dodging the obstacle, to avoid the obstacle.

A processor of the movable object may control an actuating apparatus of the movable object to fly according to a dodging direction obtained by calculation, to avoid the obstacle.

In this embodiment of the present invention, collision of the movable object and a dodging direction can be accurately informed according to the acceleration information of the movable object, to effectively avoid an obstacle and avoid continuously hitting the obstacle. Further, an IMU built in the movable object may be used as an apparatus for detecting the acceleration information, and no additional hardware needs to be added, to reduce hardware costs.

Figure 6:
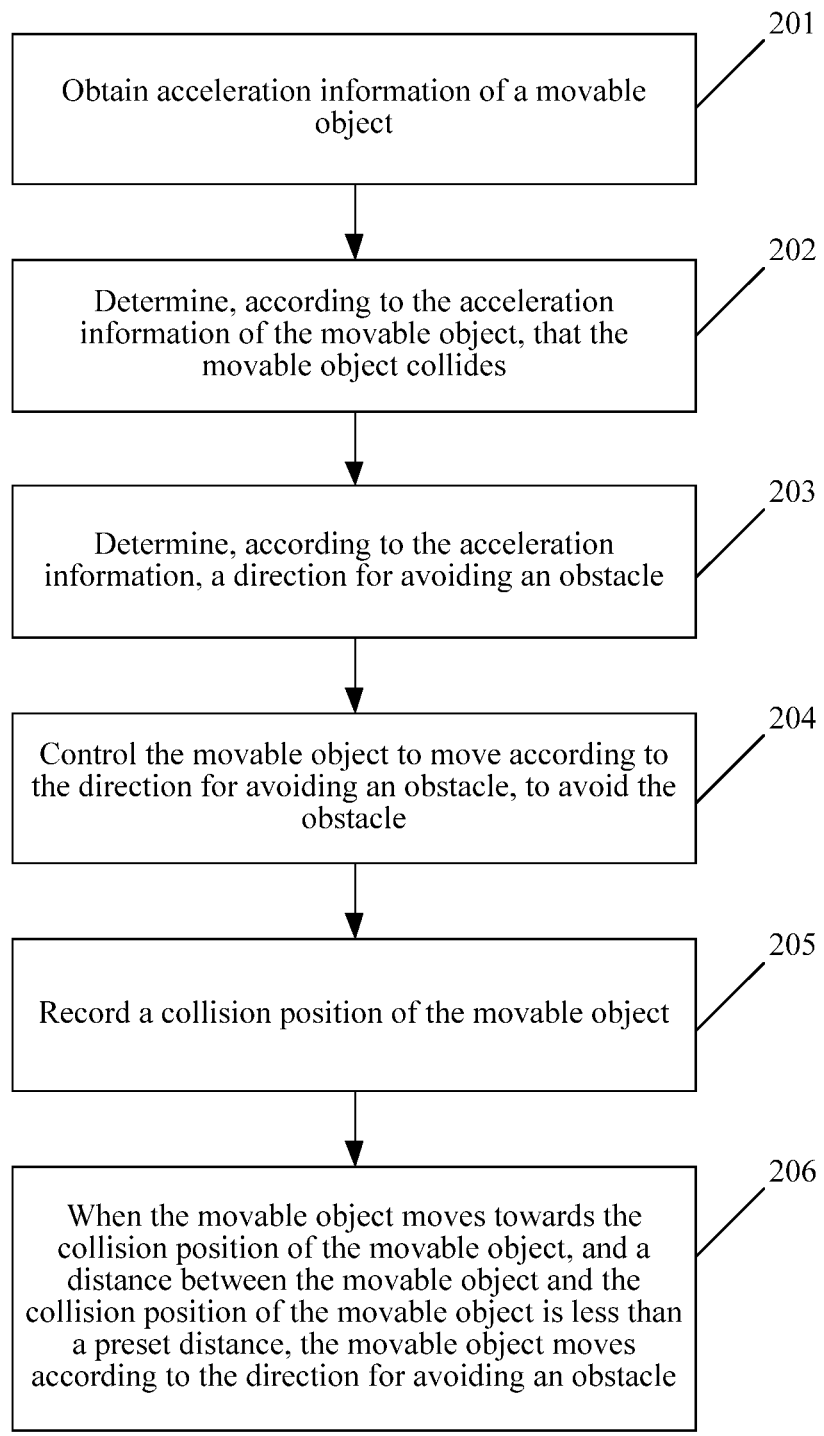
FIG. 6 is a flowchart of a method for dodging an obstacle according to another embodiment of the present invention.

As shown in FIG. 6, FIG. 6 is a flowchart of a method for dodging an obstacle according to another embodiment of the present invention. Steps 201 to 204 are the same as steps 101 to 104 in the above described embodiment, and details are not described herein again.

Compared with the above described embodiment, this embodiment further includes the following steps:

Step 205: Record a collision position of the movable object.

The location includes geographical coordinates and a flight height.

In another embodiment, step 205 may be performed after step 202, that is, a collision location is immediately recorded after it is determined that the movable object collides.

In an embodiment of the present invention, collision location information may be sent to a control device, so that makes the control device display the location information, inform an operator the geographical location, and prevent the operator from controlling the movable object to move to the location to hit the obstacle again.

Step 206: When the movable object moves towards the collision position of the movable object, and a distance between the movable object and the collision position of the movable object is less than a preset distance, the movable object moves along the direction for dodging the obstacle.

In this embodiment of the present invention, by recording the collision location of the movable object, when the movable object moves towards the location and is relatively close to the location, the movable object moves along the direction for dodging the obstacle, which is capable of avoiding collision, and further ensure safety of the movable object.

In another embodiment, when the movable object moves towards the collision location, and a distance between the movable object and the collision location is less than a preset distance, the movable object moves according to a preset rule or a control instruction, to avoid collision.

The preset rule may be controlling the movable object to fly in a direction such as below, above, or on the left or right of the collision location and away from the collision location by a specified distance, or staying at a current location and waiting for a subsequent control instruction and the like.

In an embodiment of the present invention, when the movable object moves towards the collision location, and a distance between the movable object and the collision location is less than the preset distance, the movable object sends alert information to a control device.

In an embodiment of the present invention, when the movable object moves towards the collision location, and a distance between the movable object and the collision location is less than the preset distance, the movable object sends alert information to a control device, and receives a control instruction returned by the control device, to avoid collision again.

An embodiment of the present invention further provides an apparatus for dodging an obstacle. The apparatus is configured to implement the foregoing embodiments and implementations, and what has been described is not described in detail again. As used below, a term "module" may implement a combination of software and/or hardware having a preset function. Although the apparatus described in the following embodiments may be implemented by using software, implementation by using hardware or a combination of software and hardware is also possible and is conceived.

Figure 7:
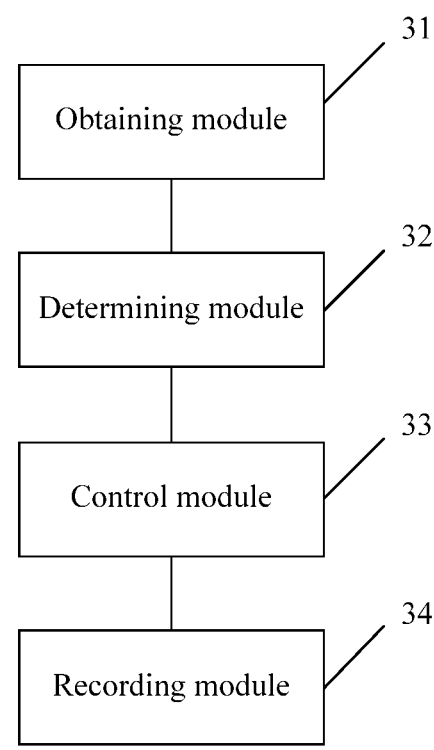
FIG. 7 is a structural block diagram of an apparatus for dodging an obstacle according to an embodiment of the present invention.

As shown in FIG. 7, the apparatus for dodging an obstacle in this embodiment of the present invention includes:

an obtaining module 31, configured to obtain acceleration information of the movable object;

a determining module 32, configured to determine, according to the acceleration information of the movable object, that the movable object collides; and determine, according to the acceleration information, a direction for dodging an obstacle; and a control module 33, configured to control the movable object to move along the direction for dodging the obstacle, to avoid the obstacle.

In an embodiment of the present invention, the acceleration information includes an acceleration change rate of at least one direction.

In an embodiment of the present invention, the determining module 32 is specifically configured to:

determine whether the acceleration change rate of the at least one direction is greater than an acceleration change rate threshold; and if yes, determine that the movable object collides.

In an embodiment of the present invention, the determining module 32 is specifically configured to:

determine an acceleration change rate of the movable object according to a vector sum of the acceleration change rate of the at least one direction; and determine a direction of the acceleration change rate as the direction for dodging the obstacle.

In an embodiment of the present invention, the determining module 32 includes a calculation module, and the calculation module is configured to:

calculate angles α, β and γ between the acceleration change rate of the movable object and x axis, y axis and z axis in three-dimensional space:

$$\alpha = \tan^{-1} \frac{\sqrt{\Delta A_y^2 + \Delta A_z^2}}{\Delta A_x}; \beta = \tan^{-1} \frac{\sqrt{\Delta A_y^2 + \Delta A_x^2}}{\Delta A_z}; \text{ and}$$

$$\gamma = \tan^{-1} \frac{\sqrt{\Delta A_x^2 + \Delta A_z^2}}{\Delta A_y},$$

where $\Delta A_x$, $\Delta A_y$, and $\Delta A_z$ are respectively acceleration change rates in three directions of x axis, y axis and z axis perpendicular to each other; and the determining module 32 determines, according to the α, β and γ, the direction for dodging the obstacle.

In an embodiment of the present invention, x axis is a moving direction of the movable object.

In an embodiment of the present invention, the movable object is an aerial vehicle, and a positive direction of x axis is the flight direction of the aerial vehicle.

In an embodiment of the present invention, the acceleration information includes acceleration change rates of two or three directions.

In an embodiment of the present invention, the obtaining module 31 is specifically configured to:

obtain the acceleration information measured by an IMU built in the movable object.

In an embodiment of the present invention, the apparatus further includes a recording module 34, and the recording module 34 is configured to record a collision location of the movable object.

In an embodiment of the present invention, the location includes geographical coordinates and a flight height.

In an embodiment of the present invention, the control module 33 is further configured to:

when the movable object moves towards the collision position of the movable object, and a distance between the movable object and the collision position of the movable object is less than a preset distance, control the movable object to move along the direction for dodging the obstacle.

In an embodiment of the present invention, the obtaining module 31 may be an inertial measurement chip, the determining module 32 may be a processor, and the control module 33 may be a control chip such as a flight control chip. The recording module 34 may be a memory.

In this embodiment of the present invention, collision of the movable object and a dodging direction can be accurately informed according to the acceleration information of the movable object, to effectively avoid an obstacle and avoid continuously hitting the obstacle. In an optional solution, an IMU built in the movable object may be used as an apparatus for detecting the acceleration information, and no additional hardware needs to be added, to reduce hardware costs. In an optional solution, the collision location of the movable object is recorded. When the movable object moves towards the location and is relatively close to the location, the movable object moves along the direction for dodging the obstacle, to avoid collision, which further ensures safety of the movable object.

An embodiment of the present invention further provides a movable object, including a processor and a computer readable storage medium, where the computer readable storage medium stores an instruction, and when the instruction is executed by the processor, any of the foregoing methods for dodging an obstacle is implemented.

An embodiment of the present invention further provides a computer readable storage medium, storing a computer program, where when the computer program is executed by a processor, any of the foregoing methods for dodging an obstacle is implemented.

The computer readable storage medium may include but is not limited to: various mediums that can store program code such as a USB flash drive, a read-only memory (ROM), a random access memory (RAM), a removable hard disk, a magnetic disc, and an optical disc.

Obviously, a person skilled in the art should understand that the modules or the steps in the embodiments of the present invention may be implemented by using a general-purpose calculation apparatus. The modules or the steps may be integrated on a single calculation apparatus, or distributed on a network formed by multiple calculation apparatuses. Optionally, the modules or the steps may be implemented by using program code that can be executed by a calculation apparatus. Therefore, the modules or the steps may be stored in a storage apparatus and is executed by a calculation apparatus. Meanwhile, in some cases, the steps shown or described may be performed in a sequence different from that herein, or may be separately produced as integrated circuit modules, or multiple modules or steps thereof are produced as a single integrated circuit module for implementation. Therefore, the embodiments of the present invention are not limited to any particular combination of hardware and software.

Although implementations of the present invention are disclosed above, the foregoing content is only intended to facilitate understanding of implementations used in the present invention, instead of limiting the present invention. Any person skilled in the art of the present invention may make any change or modification to forms or details of implementations without departing from the spirit and scope disclosed in the present invention, but the patent protection scope of the present invention still needs to be subject to the appended claims.

What is claimed is:

1. A method for dodging an obstacle, applied to a movable object, wherein the method comprises:

obtaining acceleration information of the movable object;

determining, according to the acceleration information of the movable object, that the movable object collides;

determining, according to the acceleration information, a direction for dodging an obstacle; and controlling the movable object to move along the direction for dodging the obstacle, to avoid the obstacle;

wherein the acceleration information comprises an acceleration change rate of at least one direction;

wherein the determining, according to the acceleration information, a direction for dodging an obstacle comprises:

determining an acceleration change rate of the movable object according to a vector sum of the acceleration change rate of the at least one direction; and determining a direction of the acceleration change rate as the direction for dodging the obstacle;

wherein the determining a direction of the acceleration change rate as the direction for dodging the obstacle comprises:

calculating angles α, β and γ between the acceleration change rate of the movable object and x axis, y axis and z axis in three-dimensional space:

$$\alpha = \tan^{-1} \frac{\sqrt{\Delta A_y^2 + \Delta A_z^2}}{\Delta A_x}; \beta = \tan^{-1} \frac{\sqrt{\Delta A_y^2 + \Delta A_x^2}}{\Delta A_z}; \text{ and}$$

$$\gamma = \tan^{-1} \frac{\sqrt{\Delta A_x^2 + \Delta A_z^2}}{\Delta A_y};$$

wherein $\Delta A_x$, $\Delta A_y$, and $\Delta A_z$ are respectively acceleration change rates in three directions of x axis, y axis and z axis perpendicular to each other; and determining, according to the α, β and γ, the direction for dodging the obstacle.

2. The method according to claim 1, wherein the determining, according to the acceleration information of the movable object, that the movable object collides comprises:

determining whether the acceleration change rate of the at least one direction is greater than an acceleration change rate threshold; and if yes, determining that the movable object collides.

3. The method according to claim 1, wherein the movable object is an aerial vehicle, and a positive direction of x axis is a flight direction of the aerial vehicle.

4. The method according to claim 1, wherein the acceleration information comprises acceleration change rates of two or three directions.

5. The method according to claim 1, wherein the obtaining acceleration information of the movable object comprises:
obtaining the acceleration information measured by an inertial measurement unit (IMU) built in the movable object.

6. The method according to claim 1, wherein the method further comprises:
recording a collision position of the movable object.

7. The method according to claim 6, wherein the position comprises geographical coordinates and a flight height.

8. The method according to claim 6, wherein the method further comprises:
when the movable object moves towards the collision position of the movable object, and a distance between the movable object and the collision position of the movable object is less than a preset distance, moving, by the movable object, along the direction for dodging the obstacle.

9. An aerial vehicle, comprising:
a vehicle body;
an arm, connected to the vehicle body;
an actuating apparatus, disposed on the arm;
a processor; and
an IMU, in communication connection with the processor, and configured to obtain acceleration information of the aerial vehicle, wherein
the processor is configured to:
determine, according to the acceleration information of the aerial vehicle, that the aerial vehicle collides;
determine, according to the acceleration information, a direction for dodging an obstacle; and
control the aerial vehicle to move along the direction for dodging the obstacle, to avoid the obstacle;
wherein the acceleration information comprises an acceleration change rate of at least one direction;
wherein the processor is configured to:
determine an acceleration change rate of the aerial vehicle according to a vector sum of the acceleration change rate of the at least one direction; and
determine a direction of the acceleration change rate as the direction for dodging the obstacle;
wherein the processor is configured to:
calculate angles α, β and γ between the acceleration change rate of the aerial vehicle and x axis, y axis and z axis in three-dimensional space:

$$\alpha = \tan^{-1}\frac{\sqrt{\Delta A_y^2 + \Delta A_z^2}}{\Delta A_x}; \beta = \tan^{-1}\frac{\sqrt{\Delta A_y^2 + \Delta A_x^2}}{\Delta A_z}; \text{and}$$

$$\gamma = \tan^{-1}\frac{\sqrt{\Delta A_x^2 + \Delta A_z^2}}{\Delta A_y},$$

wherein
$\Delta A_x$, $\Delta A_y$ and $\Delta A_z$ are respectively acceleration change rates in three directions of x axis, y axis and z axis perpendicular to each other; and
determine, according to the α, β and γ, the direction for dodging the obstacle.

10. The aerial vehicle according to claim 9, wherein the processor is configured to:
determine whether the acceleration change rate of the at least one direction is greater than an acceleration change rate threshold; and
if yes, determine that the aerial vehicle collides.

11. The aerial vehicle according to claim 9, wherein x axis is a moving direction of the aerial vehicle.

12. The aerial vehicle according to claim 9, wherein the acceleration information comprises acceleration change rates of two or three directions.

13. The aerial vehicle according to claim 9, wherein the processor is further configured to:
record a collision location.

14. The aerial vehicle according to claim 13, wherein the location comprises geographical coordinates and a flight height.

15. The aerial vehicle according to claim 13, wherein the processor is further configured to:
when the aerial vehicle moves towards the collision position of the aerial vehicle, and a distance between the aerial vehicle and the collision position of the aerial vehicle is less than a preset distance, control the aerial vehicle to fly along the direction for dodging the obstacle.

* * * * *